United States Patent
Anderson

(10) Patent No.: US 9,629,352 B2
(45) Date of Patent: Apr. 25, 2017

(54) ANIMAL ENTRAPMENT DEVICE AND SYSTEM

(71) Applicant: Leonard E. Anderson, Wadena, MN (US)

(72) Inventor: Leonard E. Anderson, Wadena, MN (US)

( * ) Notice: Subject to any disclaimer, the term of this patent is extended or adjusted under 35 U.S.C. 154(b) by 226 days.

(21) Appl. No.: 14/539,457

(22) Filed: Nov. 12, 2014

(65) Prior Publication Data
US 2015/0128481 A1 May 14, 2015

Related U.S. Application Data

(60) Provisional application No. 61/962,655, filed on Nov. 13, 2013.

(51) Int. Cl.
*A01M 23/08* (2006.01)
*A01M 23/30* (2006.01)
*A01M 23/24* (2006.01)

(52) U.S. Cl.
CPC ............ *A01M 23/30* (2013.01); *A01M 23/08* (2013.01); *A01M 23/24* (2013.01)

(58) Field of Classification Search
CPC ........ A01K 1/035; A01K 15/027; A01K 1/01; A01K 1/0254; A01K 31/22; A01K 1/033; A01K 1/03; Y10T 29/49826; A61B 2503/40
USPC ........ 43/58, 60, 61, 64–74, 81, 81.5, 82, 83, 43/83.5; 119/416–537, 702–704
See application file for complete search history.

(56) References Cited

U.S. PATENT DOCUMENTS

| | | | | |
|---|---|---|---|---|
| 4,677,938 A * | 7/1987 | Tominaga | ............... | A01K 1/031 119/421 |
| 4,824,098 A * | 4/1989 | Huang | .................... | A63F 7/042 273/113 |
| 4,953,502 A * | 9/1990 | Hoover | ................ | A01K 15/025 119/416 |
| 5,054,427 A * | 10/1991 | Hoover | .................. | A01K 1/031 119/416 |
| 5,078,094 A * | 1/1992 | Hoover | .................. | A01K 1/031 119/174 |
| 5,297,502 A * | 3/1994 | Jaeger | .................... | A01K 1/031 119/420 |
| 5,732,945 A * | 3/1998 | Sofia | ........................ | A63F 7/042 273/111 |
| 5,868,102 A * | 2/1999 | Petty | .................... | A01K 15/025 119/706 |
| 6,079,151 A * | 6/2000 | Bishoff | ................. | A01M 1/026 43/131 |
| 6,575,462 B2 * | 6/2003 | Roy | ........................ | A63J 11/00 273/118 R |
| 2004/0025410 A1 * | 2/2004 | Shapland | .............. | A01M 23/12 43/65 |

(Continued)

OTHER PUBLICATIONS

"Declaration of Leonard Eugene Anderson under 37 C.F.R. 1.56," dated Nov. 10, 2016, 6 pages.

*Primary Examiner* — Shin Kim
(74) *Attorney, Agent, or Firm* — Faegre Baker Daniels LLP

(57) ABSTRACT

A system and device for capturing or entrapping pests, such as rodents, is described herein. In some embodiments, the device includes an opening in the bottom of the device which allows the pest to enter the device. In some embodiments, the device may include a kill trap. In other embodiments, the device may be used to live capture the pest.

20 Claims, 3 Drawing Sheets

(56) References Cited

U.S. PATENT DOCUMENTS

| | | | | |
|---|---|---|---|---|
| 2008/0047554 | A1* | 2/2008 | Roy | A01K 1/031 128/203.15 |
| 2009/0107029 | A1* | 4/2009 | Ha | A01M 23/18 43/61 |
| 2010/0077961 | A1* | 4/2010 | Lipscomb | A01K 15/025 119/28.5 |
| 2010/0089333 | A1* | 4/2010 | Stevenson | A01K 1/031 119/418 |
| 2013/0333273 | A1* | 12/2013 | Esculier | A01M 23/02 43/58 |
| 2014/0230746 | A1* | 8/2014 | Chapman | A01K 1/0254 119/453 |
| 2015/0373944 | A1* | 12/2015 | Hall | A01K 1/033 119/498 |
| 2016/0128301 | A1* | 5/2016 | Venezia | A01K 63/003 119/248 |

* cited by examiner

ANIMAL ENTRAPMENT DEVICE AND SYSTEM

CROSS-REFERENCE TO RELATED APPLICATIONS

This application claims the benefit of U.S. provisional application No. 61/962,655, filed Nov. 13, 2013, which is commonly owned and is incorporated herein in its entirety by reference.

BACKGROUND

Single animal entrapment devices require individual devices to be positioned one-by-one. Similarly, such entrapment devices must be checked and cleaned one-by-one. These tasks require considerable time and effort.

A multi-catch device or system entraps multiple animals, such as rodents, in a single system. Previous multi-catch devices suffered from many drawbacks including overwind and/or underwinding. In some previous multi-catch devices, one wrongly caught rodent could disable the entire system. The selection of materials is also important as metal materials can rust when exposed to certain environments, such as external environments and environments with high moisture content.

Positioning of an entrapment device can affect the effectiveness of the device. For example, flat bottom units placed on the ground and/or on floors often attract animals in addition to the target animals. For example, non-target animals may investigate devices placed on the ground and become entrapped by the same. Additionally, devices located on the ground or other horizontal surfaces may become shelters or refuges for animals. Horizontal entry systems, or systems in which the target animal enters the device along a horizontal plane, may also collect debris, moisture, ice and/or snow.

Some entrapment devices use pesticides or rodenticides. Such devices typically require heavy blocks or anchors to secure the device and prevent off-site removal.

SUMMARY

Disclosed herein are various embodiments of an animal entrapment device, as well as systems and methods of using the same.

Some embodiments disclose a system for capturing a pest including a first module. The first module may include a bottom portion, a top portion, a first side portion, a second side portion, a first end portion and a second end portion. One of the first side portion or the second side portion is attachable to a surface for mounting the first module to the surface such that the bottom portion is closer to ground than the top portion. The bottom portion includes an opening sized to enable the pest to enter into the first module. The opening is positioned at least a length of the pest from the first end and at least a length of the pest from the second end.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
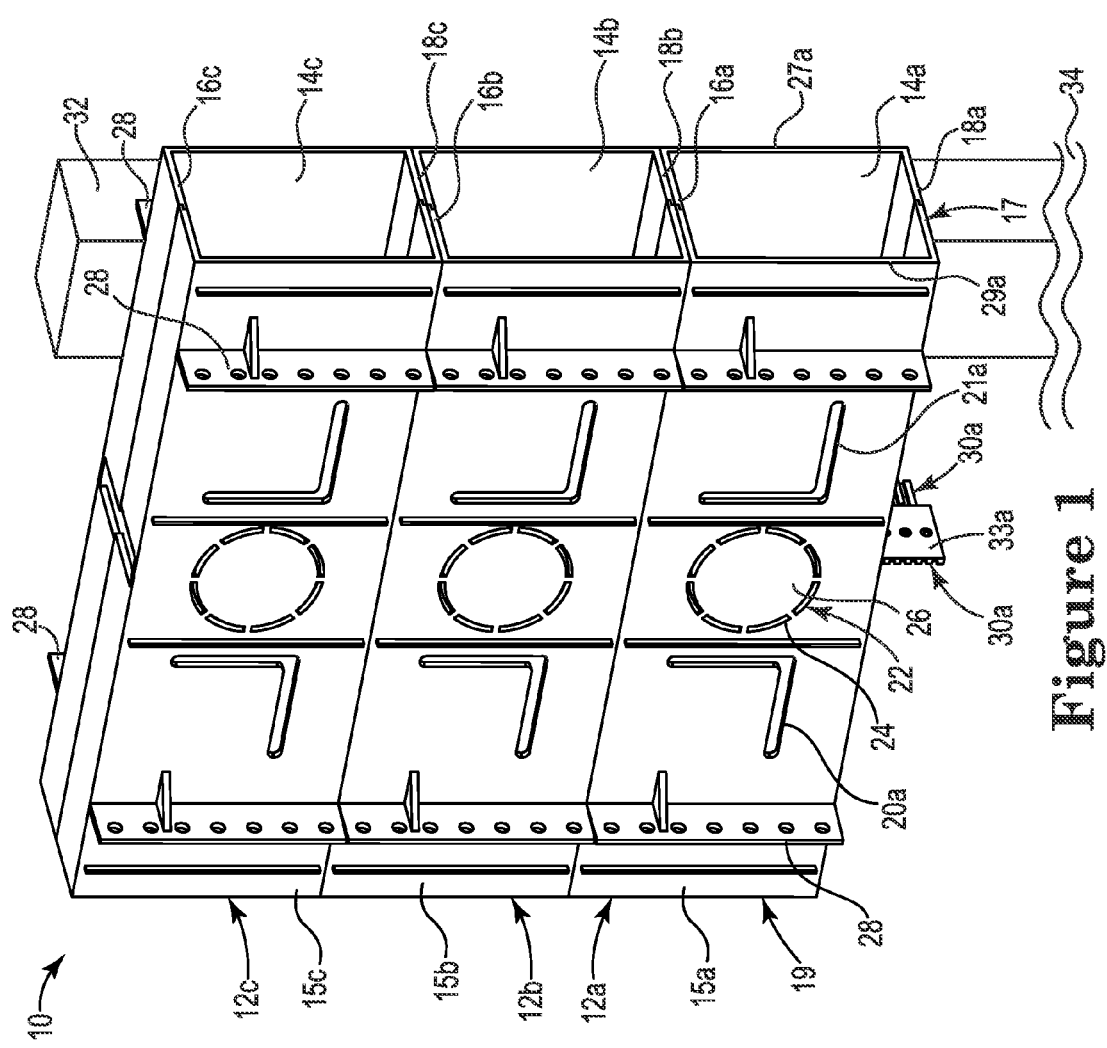
FIG. 1 is a perspective view of an entrapment system according to embodiments of the present invention.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

FIG. 1 is perspective view of an entrapment system 10 comprising a plurality of entrapment modules or housings designated individually as 12a, 12b, 12c and referred to generally as module 12 or modules 12. System 10 is designed to entrap animals. In some embodiments, system 10 may be designed to entrap animals that climb vertically. For example, system 10 may entrap animals such as but not limited to rodents, such as mice, rats, chipmunks, squirrels, prairie dogs, porcupines, beavers, guinea pigs, and hamsters, mammals of the Lagomorpha order such as rabbits and hares, and feral cats. As used herein, "target animal" refers to the animal species desired to be entrapped. In some embodiments, modules 12 and system 10 are designed to entrap a target animal while minimizing or eliminating the entrapment of undesired species. For example, in some embodiments, modules 12 and system 10 may be designed to entrap mice (the target animal) while minimizing or eliminating the entrapment of non-target animals, such as birds. In some embodiments, system 10 may be designed to entrap multiple animals and/or multiple target animals.

Entrapment module 12a includes a first side 14a, a second side 15a, a top 16a and a bottom 18a. First and second sides 14a and 15a are opposite one another and in some embodiments may be parallel or substantially parallel to one another. Top 16a and bottom 18a are also opposite one another and may be perpendicular or substantially perpendicular to first and second sides 14a and 15a. In some embodiments, first side 14a and second side 15a may be connected to and extend between top 16a and bottom 18a. For example, first side 14a, second side 15a, top 16 and bottom 18 may form a four-sided enclosure with open first and second ends 17a and 19a.

In some embodiments, first side 14a and/or second side 15b may include one or more openings, such as first and second viewing openings 20a and 21a. In some embodiments, viewing openings 20a and 21a enable a user or inspector to see at least a portion of the interior of module 12a.

In some embodiments, first side 14a and/or second side 15a may include a side entry port 22a. Side entry port 22a may connect module 12a to another structure such as a horizontally adjacent module 12 and/or the interior of a wall or other structure. In some embodiments, side entry port 22a may be defined by perforations or spaced apart openings 24a. FIG. 1 illustrates side entry port 22 in a closed position. To open side entry port 22a, perforations 24a may be connected such that center portion 26a is disconnected from the remainder of first side 14a. Once disconnected from first side 14a, center portion 26a may be removed, forming an opening in module 12a.

In some embodiments, one or more brackets 28 may extend or project from the exterior surface of first and/or second sides 14*a*, 15*a*. In some embodiments, brackets 28 may connect or attached module 12*a* and/or system 10 to a support structure as discussed further herein. Brackets 28 may have any suitable shape, size or design that enables connection of the module 12*a* to another structure, such as a wall or a horizontally adjacent module.

As shown in FIG. 1, two or more modules 12 may be stacked vertically such that bottom 18*b* of module 12*b* is adjacent and parallel or substantially parallel to top 16*a* of the adjacent module 12*a*. Modules 12*a* and 12*b* may be connected using any suitable types of connections, including but not limited to fasteners such as but not limited to screws, bolts, pins and clips, and connections such as but not limited to snap connections and tongue and grove connections. Although FIG. 1 illustrates three modules 12*a*, 12*b* and 12*c* stacked vertically, any suitable number of modules 12 may be vertically stacked.

Modules 12 may be formed of any suitable material. In some embodiments, modules 12 may be formed of a weather resistant material, such as PVC or other polymeric material, such that the modules do not rust or deteriorate when exposed to harsh environments such as elevated temperatures (i.e., temperatures above 100 F), direct sunlight, low or reduced temperatures (i.e., temperatures at or below freezing), and/or moisture, such as rain, sleet, hail and snow.

Bottom 18*a* of module 12*a* includes an opening (shown in FIG. 2) through which the target animal can enter module 12*a* and system 10. In some embodiments, one or more ramps 30 having a proximal end 31*a* (shown in FIG. 2) and a distal end 33*a* extend from module 12*a*. Proximal end 31*a* is connected to module 12*a*. Distal end 33*a* is opposite proximal end 31*a*. In some embodiments, ramp 30 may be textured to provide a frictional surface for the target animal. For example, ramp 30 may include a plurality of depressions distributed across the surface of ramp 30. For example, ramp 30 may include alternating depression strips. In other embodiments, ramp 30 may include a plurality of depressed or raised dimples. In some embodiments, ramps 30 may be formed of the same material as module 12. In other embodiments, ramps 30 may be formed from a different material than module 12. In some embodiments, ramps 30 may be integrally formed with at least a portion of module 12. In other embodiments, ramps 30 may be separate from and connected by a suitable fastener or other connection to at least a portion of module 12.

In use, one of the sides 14*a* or 15*a* may be attached to or hung from a support 32, such as a wall, post or other structure, for example using bracket 28. In some embodiments, module 12*a* is oriented such that bottom 18*a* is parallel or substantially parallel to a surface 34 that the target animal is traveling, such as the ground or floor. In some embodiments, bottom 18*a* is closer to surface 34 than top 16*a* is to surface 34. Bottom 18*a* may be elevated or spaced apart from surface 34 such that module 12*a*, and specifically bottom 18*a*, does not contact surface 34.

In some embodiments, ramp 30*a* may be spaced apart from surface 34 such that ramp 30 does not contact or touch the surface 34. The distance between distal end 33*a* of ramp 30 and surface 34 may be varied. In some embodiments, the distance between distal end 33*a* and surface 34 is chosen based on size and climbing abilities of the target animal.

In some embodiments, module 12*a* may be formed by a two component construction. For example, module 12*a* may be formed by a first component 29*a* and a second component 29*b*. In some embodiments, first component 29*a* and second component 29*b* may snap together, for example using latches or catches, to form module 12*a* having a first side 14*a*, second side 15*a*, bottom 18*a* and top 16*a*. Although a snap connection is disclosed, first and second components 29*a*, 29*b* may be joined by any suitable means, including bolts, screws and snaps. Additionally or alternatively, first and second components 29*a*, 29*b* may be joined with tongue and groove connections.

As discussed herein, additional modules 12 may be joined or connected to module 12*a* in the vertical direction (i.e, so that top 16*a* of module 12*a* is adjacent bottom 18*b* of module 12*b*) or in the horizontal direction (i.e, so that first side 14*a* of module 12*a* is adjacent second side 15*b* of second module 12*b*). The modular design of system 10 enables multiple levels of modules 12 in the horizontal direction, the vertical direction, or a combination thereof.

Figure 2:
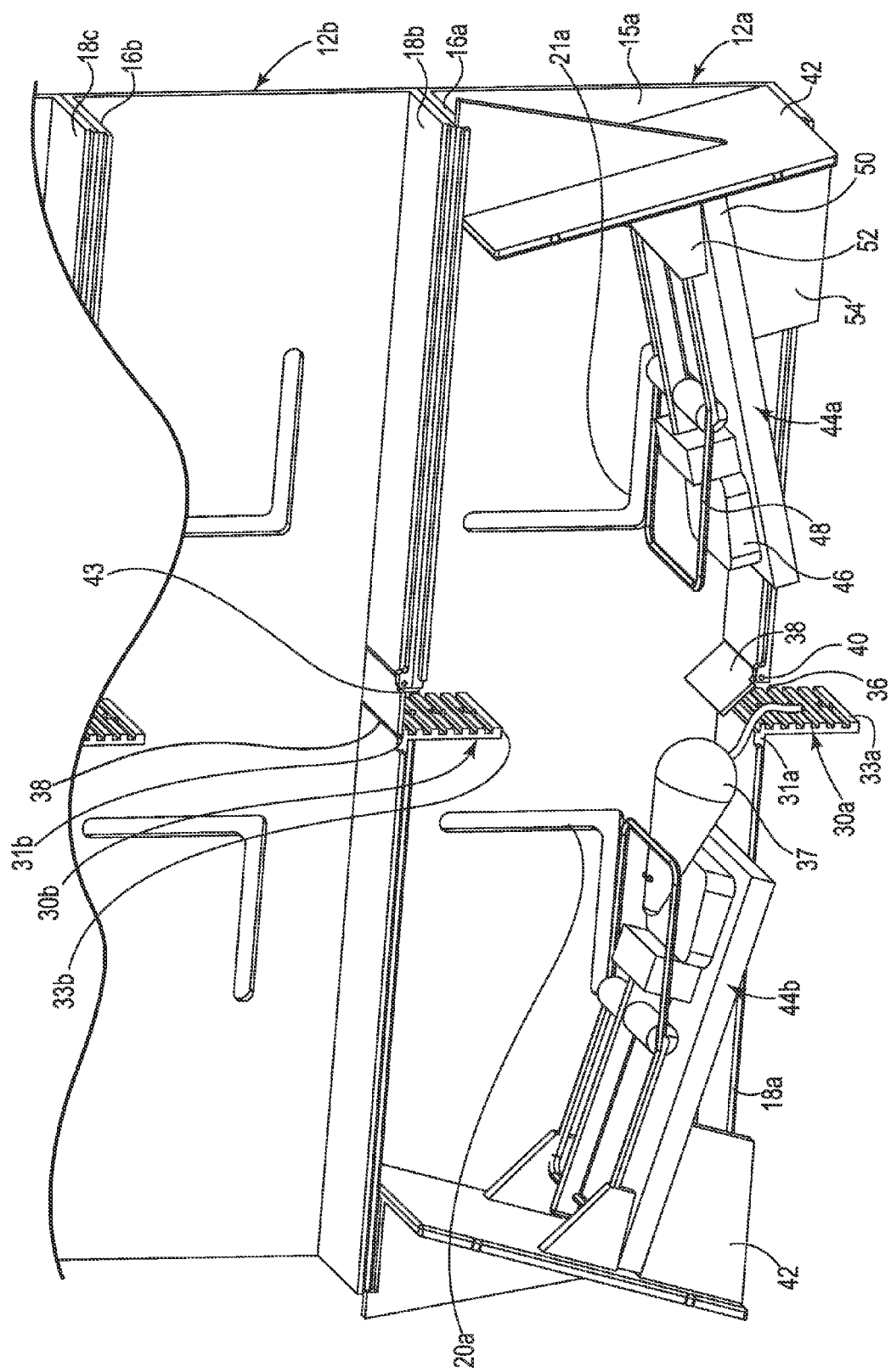
FIG. 2 is a cross-sectional view of the entrapment system of FIG. 1.

FIG. 2 is a cross-sectional view of FIG. 1 and shows the interior of modules 12 of FIG. 1. Bottom 18 may include an opening 36, which is sized to allow a target animal 37 to enter the module 12. In some embodiments, opening 36 is positioned at least a minimum length from the first end 17 and the second end 19. In some embodiments, the minimum length may be the average length of an adult target animal. For example where the target animal is a mouse, the minimum length from the opening 36 to the first end 17 and the minimum length from the opening 36 to the opening may be at least the average length of an adult mouse. In some embodiments, spacing opening 36 at least a minimum distance from first end and second end 17*a*, 19*a* enables the target animal to be fully within the module 12 before triggering trap 44. Additionally, spacing the opening a minimum distance from the first and second ends 17*a*, 19*a*, creates capture areas on either side of opening 36.

In some embodiments, bottom 18 may further include door 38 and sized to cover opening 36. Door 38 may connect to bottom 18 using any suitable connection. In some embodiments, door 38 may connect to bottom 18 at a pivot or hinge 40. In some embodiments, door 38 may completely cover opening 36 in a closed position. When in an open position, door 38 may allow target animal 37 to enter module 12.

In some embodiments, door 38 may be opened by a target animal as the animal enters the module 12. In some embodiments, door 38 may be cantilevered door and may be biased in the closed position with sufficient bias such that a target animal can open door 38 to enter the module 12. Once the target animal enters the module, door 38 may close behind the target animal, entrapping the target animal within the module 12.

In some embodiments, opening 43 may be formed in top 16. When module 12 is stacked vertically on an adjacent module 12, opening 43 may align with opening 36 in bottom 18. In some embodiments, ramp 30 may extend from bottom 18 and through opening 43 such that ramp 30 extends into the vertically adjacent module 12.

In FIG. 2, service doors or end caps 42 are positioned in the ends 17, 19 of module 12. Service doors 42 extend in a first direction from first side 14*a* to second side 15*a* and in a second direction from top 16 to bottom 18. Service doors 42 block or close the ends 17, 19 of module 12 forming an enclosure. In some embodiments, service doors 42 may connect to module 12 with a friction connection. A friction connection allows the service door 42 to be removed by a user without the use of a tool or other device. Alternatively, service door 42 may be connected with a suitable fastener, such as screws, nails, bolts, pins, or connections such as but not limited to snap connections and tongue and grove connections.

In some embodiments, module 12 may be used for live catch or live entrapment. In these embodiments, no trap, poison or other termination device or technique is present within module 12. For example, an enclosure may be formed by first side 14a, second side 15a, top 16a, bottom 18a, and service doors 42 and such enclosure may be used to contain or entrap the target animal 37. In some embodiments, doors 38 may be present on one or more openings 36 and may be biased such that the target animal can enter system 10 but is prevented from exiting.

In other embodiments, one or more traps 44a, 44b (referred to collectively as traps 44), such as kill traps or snap traps, may be present within module 12. In some embodiments, a trap 44 may be positioned on either side of bottom opening 36. In such a configuration, after a target animal enters the module through opening 36, the target animal may trigger trap 44a or trap 44b if the target animal 37 turns in either direction after entering through opening 36.

In some embodiments, trap 44 includes a trigger mechanism 46 and a bow 48. When target animal triggers the trigger mechanism 46, bow 48 is released and strikes target animal. Trigger mechanism 46 has a width as defined along an axis extending from the first side 14a to the second side 15a. In some embodiments, trigger mechanism 46 has a width substantially the same as the width between the first side 14a and the second side 15a. In some embodiments, the distance from the first side 14a to the closest edge of the trigger mechanism 46 is not larger than the average head diameter of an adult, target animal. This configuration prevents the target animal from walking between trap 44 and sides 14a and 15a.

In some embodiments, trap 44 may be attached to service door 42. Connecting trap 44 to service door 42 enables the end user to remove the service door 42 and check trap 44 with one motion. In some embodiments, trap 44 may be attached to service door 42 with suitable fasteners such as bolts, screws, clips or other fasteners. Connecting trap 44 to service door 42 secures trap 44 in place and prevents trap 44 from moving. In some embodiments, trap 44 may be connected to service door 42 with a friction grip or connection. For example the tail 50 of trap 44 may be gripped between top portion 52 and bottom portion 54 of service door 42. Use of a friction grip enables disposal of the target animal 37 without the need for tools.

In some embodiments, trap 44 may be angled as compared to the module 12. For example, the bottom of trap 44 may form angle with the bottom 18 of module 12. In some embodiments, a suitable angle may be any acute angle greater than 0 degrees (i.e., an angle greater than 0 degrees and not more than 90 degrees). In some embodiments, the tail 50 or the end opposite the trigger mechanism 46 is higher than the trigger mechanism 46. Elevating tail 50 may cause the head of the target animal to closer to the trigger mechanism 46, and may improve the effectiveness of trap 44.

In some embodiments, trap 44 is positioned such that bow 48 is visible through viewing opening 20a or 21a when trap 44 is set or when trap 44 is triggered. In some embodiments, bow 48 may be painted with fluorescent paint to enable easier observation of the position of the bow 48. For example, fluorescent and/or reflective paint may enable viewing the position of bow 48 from a distance. In some embodiments, a flashlight may be used to further enhance viewing of bow 48. Viewing openings 20a and 21a enable a user to determine if trap 44 has been triggered (i.e., by the position of bow 48) without removing service door 42.

In some embodiments, the trap 44 is spaced a sufficient distance from the opening 36. For example, in some embodiments, trap 44 is spaced at least the average body length of an adult target animal from the opening 36.

As described herein, system 10 and modules 12 create a vertical entry animal or pest entrapment system. System 10 is mounted or attached to or hung from a structure such that bottom 18 is elevated off or spaced a distance from a horizontal substrate, such as the ground. That is, system 10 does not sit on the ground. The target animal enters module 12 through opening 36. In some embodiments, module 12 may include ramp 30 to encourage the target animal to enter module 12. A vertical entry system located off the ground or floor takes advantage of the target animal's instinct to climb. Additionally, the vertical entry system may also deter other animals, such as birds, from entering.

As the target animal enters module 12 vertically, two entrapment or capture areas are located along an axis transverse to the axis the target animal is entering along. More specifically, as the target animal enters module 12, a first entrapment area is located to the left of opening 36 and a second entrapment area is located to the right of the opening 36. In some embodiments, the entrapment areas may be for live capture and may not include any additional device. In other embodiments, the entrapment areas may include an entrapment device such as a kill trap, a death clutch trap, a body grip trap, or a conibear trap.

In one method, the system may be assembled by first forming modules 12. For example, modules 12 may be formed by snapping together or otherwise connecting portions of module 12 so as to form a four-sided enclosure (i.e., an enclosure with open ends 17 and 19).

Module 12 may optionally be joined to one or more additional modules 12 to form system 10. For example module 12 may be joined to one or more additional modules 12 in a vertical direction, horizontal direction or both.

Service doors 42 may be positioned at ends 17 and 19 of modules 12. If a trap 44 is to be used, traps 44 may be positioned in module 12. In some embodiments, traps 44 may be connected or attached to module 12 or to service door 42 to maintain traps 44 in position.

System 10 may be strategically located in an area frequented by the target animal. In some embodiments, system 10 may be mounted to a wall, post or other support. In other embodiments, system 10 may be hung from a post or other support. As described herein, system 10 may be positioned so that the bottom 18 and optional ramp 30 of the lowest module 12 are spaced apart from the ground or floor.

System 10 may be inspected and serviced as needed. For example, system 10 may be inspected daily or weekly. Modules 12 may be emptied and traps 44 may be reset as needed. In some embodiments, traps 44 and/or modules 12 may include identification bar codes. In use, an inspector scans the bar codes of the trap and/or module to record the inspection date and time and the status of the traps 44.

Figure 3:
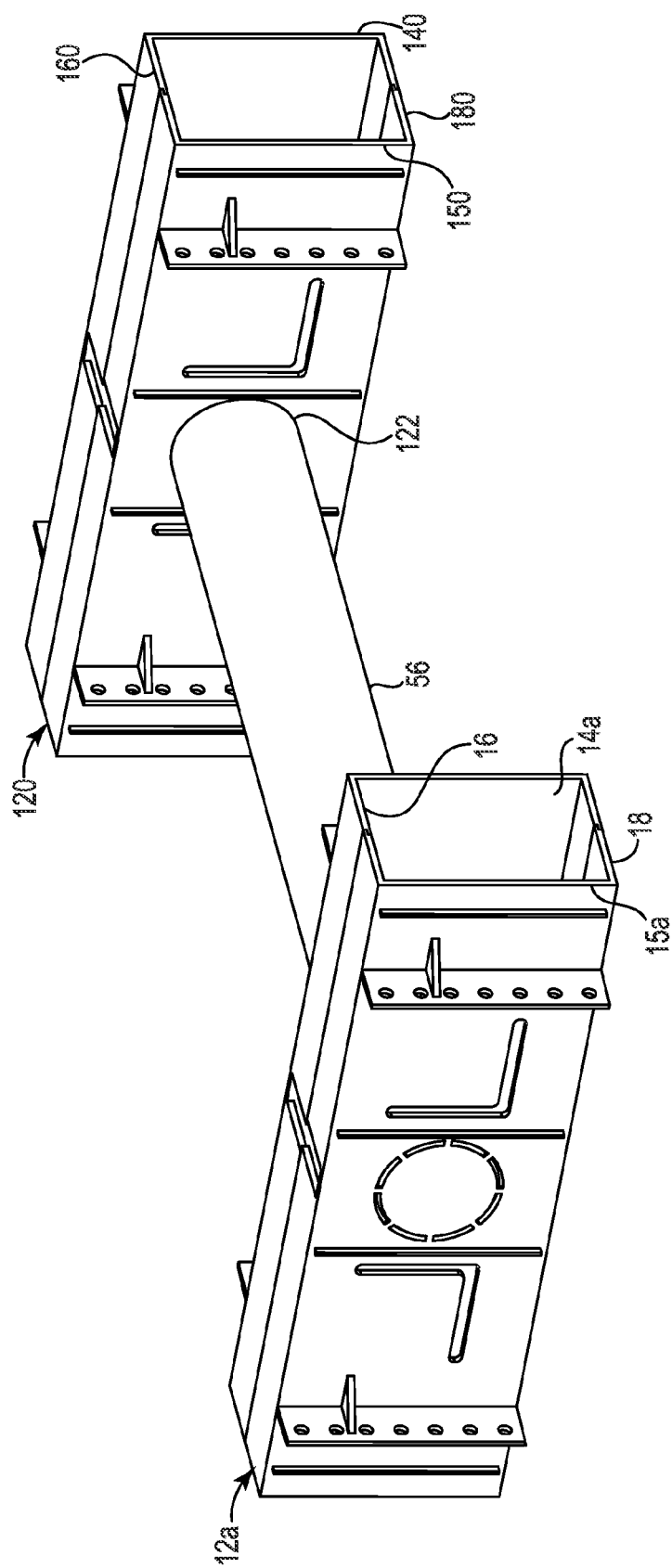
FIG. 3 is a perspective view of another entrapment system according to embodiments of the present invention.

FIG. 3 is a perspective view of another embodiment. In FIG. 3, module 12a is connected horizontally to module 120 (having first and second sides 140 and 150, top 160 and bottom 180) by connecting passage 56. In some embodiments, connecting passage 56 may connect to module 12a at side entry port 22 formed in first side 14a and may connect to module 120 at side entry port 122 formed in second side 150. Connecting passage 56 enable an entrapped target animal to travel from one module to the connected module. For example, connecting passage 56 may allow an entrapped target animal to move from module 12a to module 120.

In some embodiments, connecting passage 56 may be a tube or have a cylindrical cross-sectional shape. In other embodiments, connecting passage 56 may have any cross-sectional shape as long as connecting passage 56 is sized to enable the target animal to travel from module 12*a* to module 120 or vice ver*sa*.

Various modifications and additions can be made to the exemplary embodiments discussed without departing from the scope of the present invention. For example, while the embodiments described herein refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

I claim:

1. A system for capturing a pest, the system comprising:
    a first module including:
        a bottom portion including an opening sized to enable the pest to enter into the first module;
        a top portion opposite the bottom portion;
        a first side portion extending from the bottom portion to the top portion;
        a second side portion opposite and parallel to the first side portion;
        a first end portion extending from the first side portion to the second side portion and from the top portion to the bottom portion;
        a second end portion parallel to the first end portion and extending from the first side portion to the second side portion and from the top portion to the bottom portion;
        a cantilever door attached to the bottom portion, the door sized to cover at least a portion of the opening;
        wherein one of the first side portion or the second side portion is attachable to a surface for mounting the first module to the surface such that the bottom portion is closer to ground than the top portion, and wherein,
        the opening is positioned at least a length of the pest from the first end portion and at least the length of the pest from the second end portion.

2. The system of claim 1, wherein the first side portion is attachable to the surface and wherein the second side portion includes an opening for viewing into the first module.

3. The system of claim 1, wherein the first module further includes a kill trap having a trigger mechanism.

4. The system of claim 1, wherein the cantilever door is attached with sufficient bias that the pest can move the door and expose the opening.

5. The system of claim 1 and further comprising a second module connected to the top portion of the first module.

6. The system of claim 5 wherein the second module includes an opening aligned with an opening in the top portion of the first module such that the pest can move between the first module and the second module.

7. The system of claim 1, wherein the first side portion is attachable to the surface and further comprising a second module connected to the second side portion.

8. The system of claim 1, wherein the bottom portion extends along a horizontal axis.

9. A modular unit for the entrapment of a rodent, the unit comprising:
    a six-sided structure including a top portion, a bottom portion opposite the top portion, a first side portion perpendicular to the top portion and the bottom portion, a second side portion opposite the first side portion, a first end portion perpendicular to the top portion in a first direction and perpendicular to the first side portion in a second direction and a second end portion opposite the first end portion, the first end portion and the second end portion removably connected to the top portion, the bottom portion, the first side portion, and the second side portion;
    an opening formed in the bottom portion, the opening sized to allow the rodent to enter the structure, a first end of the opening spaced at least a length of the rodent from the first end portion and a second end of the opening spaced at least a length of the rodent from the second end portion; and
    a kill trap connected to at least one of the first end portion and the second end portion, wherein the modular unit is configured to be mounted to a surface such that the bottom portion is closer to ground than the top portion and such that the rodent enters the structure through the opening.

10. The modular unit of claim 9 wherein the first end portion and the second end portion are connected to the top portion and the bottom portion by friction connections.

11. The modular unit of claim 9 wherein the modular unit further includes a door that in a closed position covers the opening and in an open position exposes the opening, allowing the rodent to enter the structure, and wherein the door is biased in the closed position.

12. The modular unit of claim 9 wherein the modular unit further includes a viewing window configured to enable an operator to see at least a portion of an interior of the structure.

13. The modular unit of claim 9 wherein the kill trap forms an acute angle greater than 0 degrees as measured between a bottom of the kill trap and the bottom portion.

14. The modular unit of claim 9 wherein the trigger mechanism includes a first side parallel to the first side portion and a second side parallel to the second side portion, and wherein a first distance between the first side of the trigger mechanism and the first side portion is not larger than a head of the pest and a second distance between the second side of the trigger mechanism and the second side portion is not larger than the head of the pest.

15. A system for capturing a pest, the system comprising:
    a first module including:
        a bottom portion including an opening sized to enable the pest to enter into the first module;
        a top portion opposite the bottom portion;
        a first side portion extending from the bottom portion to the top portion;
        a second side portion opposite and parallel to the first side portion;
        a first end portion extending from the first side portion to the second side portion and from the top portion to the bottom portion;
        a second end portion parallel to the first end portion and extending from the first side portion to the second side portion and from the top portion to the bottom portion; and
    a kill trap having a trigger mechanism and positioned within the first module,
    wherein one of the first side portion or the second side portion is attachable to a surface for mounting the first module to the surface such that the bottom portion is closer to ground than the top portion, and wherein the opening is positioned at least a length of the pest from the first end portion and at least a length of the pest from the second end portion.

16. The system of claim 15, and further comprising a textured entry port extending from the opening towards the ground.

17. The system of claim 16, wherein the entry port extends vertically from the opening towards the ground.

18. The system of claim 15, and further comprising a second module connected to the top portion of the first module, wherein the second module includes an opening aligned with an opening in the top portion of the first module such that the pest can move between the first module and the second module.

19. The system of claim 15, wherein the opening is exposed to the ground.

20. The system of claim 15, and further comprising a cantilever door attached to the bottom portion, the door sized to cover at least a portion of the opening.

\* \* \* \* \*